Oct. 7, 1958   O. K. OLSEN   2,855,181
DRILL BITS
Filed Dec. 19, 1955
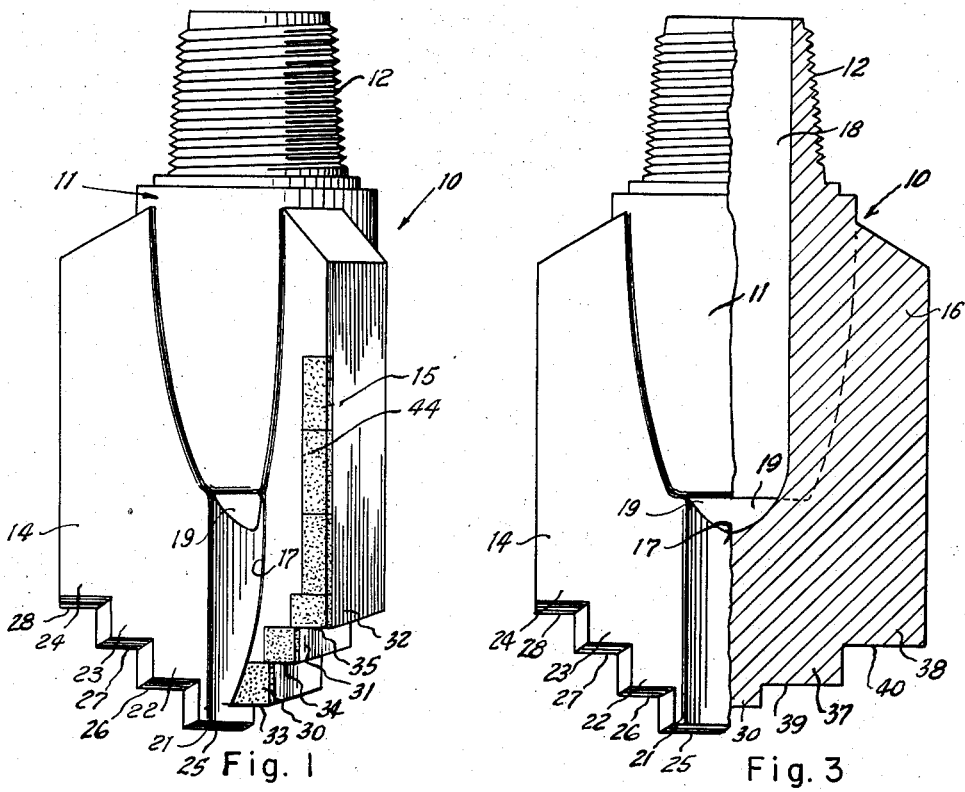
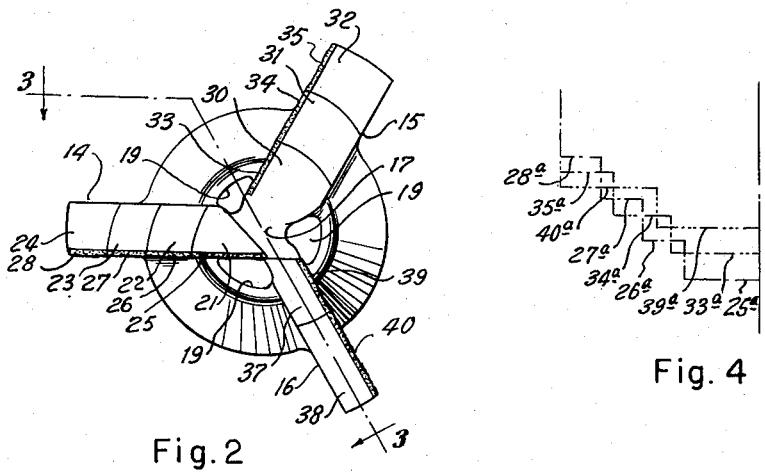
INVENTOR
Ole K. Olsen
BY
ATTORNEY

United States Patent Office 2,855,181
Patented Oct. 7, 1958

2,855,181

DRILL BITS

Ole K. Olsen, Garland, Tex.

Application December 19, 1955, Serial No. 553,831

2 Claims. (Cl. 255—61)

This invention relates to drill bits and more particularly to a drill bit having a plurality of stepped drag cutting blades.

An object of the invention is to provide a new and improved drill bit.

Another object is to provide a new and improved drill bit having a plurality of radially extending vertical drag cutting blades.

Still another object is to provide a new and improved drill bit having a plurality of radially extending vertical cutting blades, each of which has a plurality of vertically spaced steps providing a plurality of radially extending horizontal cutting edges.

A particular object of the invention is to provide a new and improved drill bit, of the type described, wherein the horizontal cutting edges of the several blades are vertically spaced with respect to each other whereby the drill bit is provided with a greater number of horizontal cutting edges than the number of its blades, and each blade cuts only a relatively narrow ledge with each cutting edge and each ledge so cut is spaced vertically in the hole, thereby assuring a straighter rounder hole.

A further object is to provide a drill bit of the type described wherein each blade is provided with hardened insets or cutter elements which provide the cutting edges.

A yet further object of the invention is to provide a drill bit, of the type described, having a longitudinal bore and flow course or apertures between the blades whereby cuttings may be washed out by drilling fluid pumped downwardly through the drill bit.

Additional objects and advantages of the invention will be readily apparent from the reading of the following description of a device constructed in accordance with the invention, and reference to the accompanying drawings thereof, wherein:

Figure 1 is a side view of the drill bit,

Figure 2 is a view of the bottom of the drill bit shown in Figure 1,

Figure 3 is a sectional view taken on line 3—3 of Figure 2, and

Figure 4 is a diagrammatic illustration of the nine horizontal cuts made by the horizontal cutting edges of the stepped blades of the drill bit of Figures 1 to 3.

Referring now to the drawing, the drill bit 10 has a body 11 provided at its upper end with a reduced threaded portion 12 by means of which it may be secured to the lower end of a drill string. The body is also provided with vertical radially extending flanges or blades 14, 15 and 16 having lower portions which extend downwardly below the body 11 and are joined together or integral with each other, as at 17, below the body. The body has a central bore or vertical axial flow passage 18 which communicates with the exterior of the body between each pair of blades through the flow outlet passages 19. It will be apparent that drilling mud or fluid may be pumped down through the drill string into the bore 18, and then outwardly through the flow outlet passages 19 to wash away the cuttings produced by the drill bit.

The blade 14 is provided with a plurality of successive upwardly and radially outwardly disposed steps 21, 22, 23 and 24, which form horizontal cutting edges 25, 26, 27 and 28, respectively, which are progessively upwardly spaced.

The blade 15 is provided with a plurality of successive upwardly and radially outwardly disposed steps 30, 31 and 32 which form horizontal cutting edges 33, 34 and 35, respectively, which are progressively upwardly spaced.

The blade 16 is similarly provided with a pair of steps 37 and 38, the step 38 being disposed above and radially outwardly of the step 37, the steps providing horizontal cutting edges 39 and 40, respectively.

The cutting edge of each blade is vertically spaced from the cutting edges of the other blades so that no cutting edge tracks or follows in the circular path of any other cutting edge as the drill bit is rotated. As a result, each horizontal cutting edge of each blade cuts a relatively small ledge portion of the formation through which the bit is progressing as it rotates, each cut being at a different level than any other cut, and, in effect, the bit operates as a nine step bit even though it has only three blades. Figure 4 diagrammatically illustrates the vertical spacing of the cuts made by each of the cutting edges, the cut made by each cutting edge being identified with the same reference character, with the letter "$a$" added thereto, as the particular cutting edge. It will be very readily apparent from an inspection of Figure 4 that each horizontal cutting edge cuts the formation, at any particular moment, at a level vertically spaced from the level of a cut being made by any other cutting edge of any blade.

The blades may be provided on their faces with hardened inserts 44, which actually form the cutting edges, to prolong the operational life of the bit. The steps may be beveled upwardly from the cutting edges thereof, as is most readily seen in Figures 1 and 3.

It will be seen now that a new and improved drill bit has been provided which includes a body 11 provided with a plurality of uniformly opposed vertical flanges or blades 14, 15 and 16, which extend radially outwardly therefrom. It will also be apparent that each blade is provided with a plurality of steps having substantially horizontal cutting edges which are disposed progressively and successively upwardly and outwardly and that no two cutting edges are disposed in the same horizontal plane. It will be further seen that each blade is provided with a different number of steps, and therefore a different number of cutting edges than the other blades. It is important to note that this construction and arrangement of the blades provides for each cutting edge to cut only a relatively narrow ledge, at vertically spaced elevations, and thus makes for a straight round hole.

Moreover, it will be apparent that the flow passages 19 between adjacent blades permit drilling fluid to pass from the bore 18 of the drill bit to the cutting edges to wash away cuttings made thereby as the drill bit rotates and progresses downwardly through a formation.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A well drill bit including: an elongate body having means at one end to secure said body to the lower end of a drill string; three elongate vertically disposed cutting blade members extending substantially radially from the longitudinal axis of said body, said cutting members being equidistantly disposed about the longitudinal axis of said body and terminating in a longitudinal outer cutting edge portion defining the diameter of a hole to be drilled, each cutting member having a leading planar surface portion extending below the lower end of the body and substantially radially from the longitudinal axis of said body, each of the cutting members having means providing lower cutting end edge portions extending substantially radially with respect to the longitudinal axis of the body, the outer cutting edge portion of each blade member intersecting the longitudinal outer cutting edge portion of said blade member, the lower cutting end edge portions comprising a plurality of stepped cutting teeth extending substantially radially with respect to the longitudinal axis of the body, each having a substantially horizontal lower cutting edge and substantially longitudinally extending edge portions between each cutting tooth and the adjacent cutting tooth on each blade member, each of the cutting members having a different number of teeth, and each having an innermost tooth and an outermost tooth; two of said cutting members having at least one intermediate tooth; said innermost teeth being stepped with respect to each other and terminating adjacent the longitudinal axis of said body, the transverse cutting edges of the innermost teeth being of a different length with respect to each other; said intermediate teeth being stepped with respect to each other and with respect to each of the innermost teeth and the outermost teeth and extending laterally outwardly different distances from the longitudinal axis of said body; the outermost teeth being stepped with relation to each other and each extending inwardly a different distance from the longitudinal outer cutting edge of its particular blade member, the lower cutting edge of each cutting tooth being formed with an inclined relief surface extending rearwardly and upwardly from the leading planar surface portion of each blade member, said innermost teeth of each cutting blade member being joined to the innermost tooth of each other cutting blade member by an axial web, said body having an axial opening therethrough open at its lower end through a central opening above the axial web joining the innermost teeth of each cutting blade for the passage of fluid therethrough.

2. A well drill bit including: an elongate body having means at one end to secure said body to the lower end of a drill string; three elongate vertically disposed cutting blade members extending substantially radially from the longitudinal axis of said body, said cutting members being equidistantly disposed about the longitudinal axis of said body and terminating in a longitudinal outer cutting edge portion defining the diameter of a hole to be drilled, each cutting member having a leading planar surface portion extending below the lower end of the body and substantially radially from the longitudinal axis of said body, each of the cutting members having means providing lower cutting end edge portions extending substantially radially with respect to the longitudinal axis of the body, the outer cutting edge portion of each blade member intersecting the longitudinal outer cutting edge portion of said blade member, the lower cutting end edge portions comprising a plurality of stepped cutting teeth extending substantially radially with respect to the longitudinal axis of the body, each having a substantially horizontal lower cutting edge and substantially longitudinally extending edge portions between each cutting tooth and the adjacent cutting tooth on each blade member, each of the cutting members having a different number of teeth, and each having an innermost tooth and an outermost tooth; two of said cutting members having at least one intermediate tooth; said innermost teeth being stepped with respect to each other and terminating adjacent the longitudinal axis of said body, the transverse cutting edges of the innermost teeth being of a different length with respect to each other; said intermediate teeth being stepped with respect to each other and with respect to each of the innermost teeth and the outermost teeth and extending laterally outwardly different distances from the longitudinal axis of said body; the outermost teeth being stepped with relation to each other and each extending inwardly a different distance from the longitudinal outer cutting edge of its particular blade member, the lower cutting edge of each cutting tooth being formed with an inclined relief surface extending rearwardly and upwardly from the leading planar surface portion of each blade member; said cutting blade member having hard surface material on the outer edges of said planar surface portions extending the major portion of the length of said longitudinal outer cutting edge portions; and said cutting teeth having rectangular overlapping inserts of hard surface material exposed on and secured to said teeth in planar alignment with the planar surface portions of said leading surfaces of said cutting blade members and on the longitudinally extending edge portions between the adjacent teeth of each blade member, said innermost teeth of each cutting blade member being joined to the innermost tooth of each other cutting blade member by an axial web, said body having an axial opening therethrough open at its lower end through a single central opening above the axial web joining the innermost teeth of each cutting blade for the passage of fluid therethrough.

References Cited in the file of this patent

UNITED STATES PATENTS

| | | |
|---|---|---|
| 580,352 | Symonds | Apr. 6, 1897 |
| 2,504,978 | Henning | Apr. 25, 1950 |
| 2,607,562 | Phipps | Aug. 19, 1952 |
| 2,693,936 | Roberts | Nov. 9, 1954 |

FOREIGN PATENTS

| | | |
|---|---|---|
| 692,373 | Great Britain | June 3, 1953 |